J. L. PERKINS, F. W. SICKLES, AND J. OAKLEY.
MULTIPLE GEAR CUTTING MACHINE.
APPLICATION FILED OCT. 28, 1919.

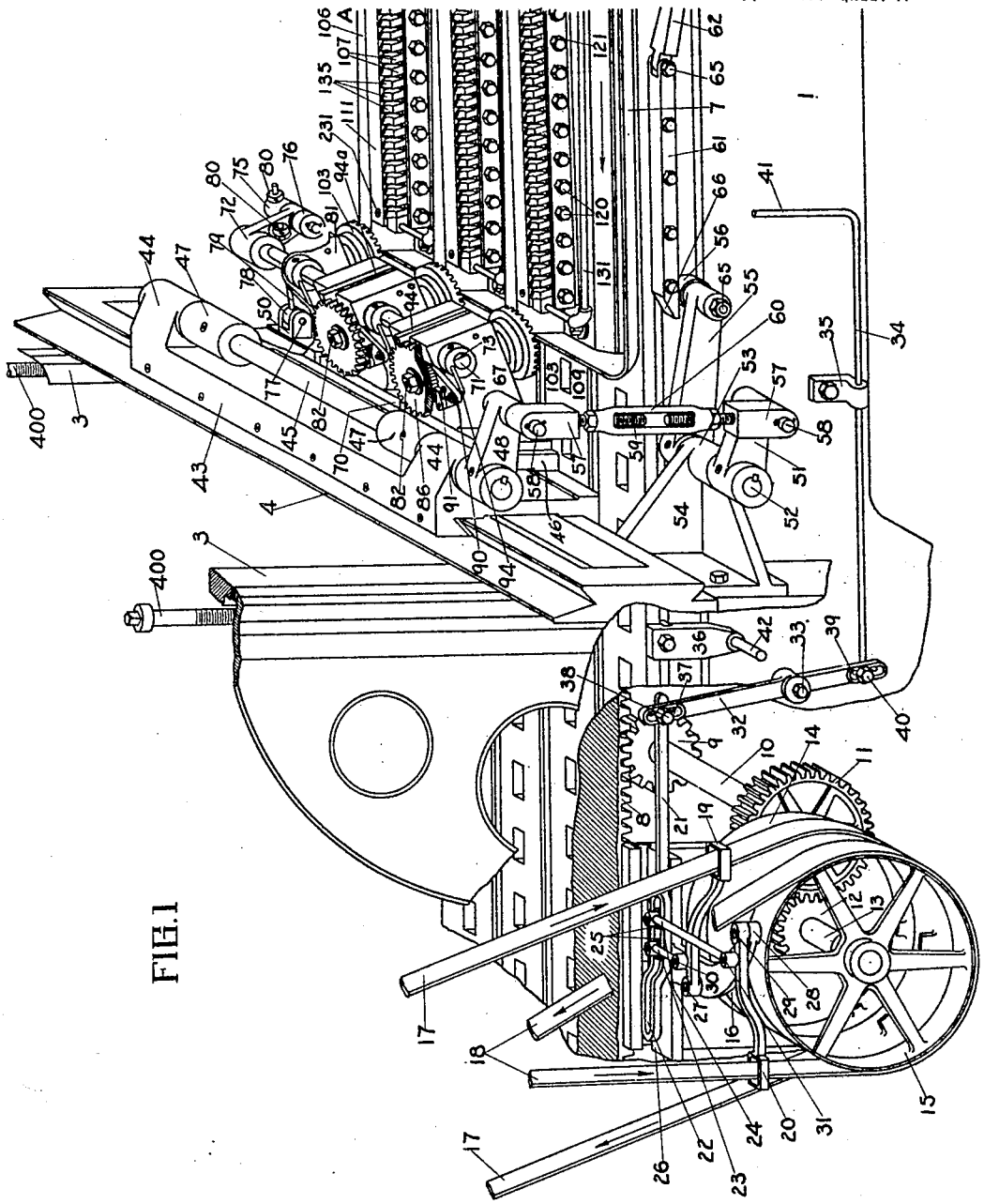

1,409,766.

Patented Mar. 14, 1922.
11 SHEETS—SHEET 2.

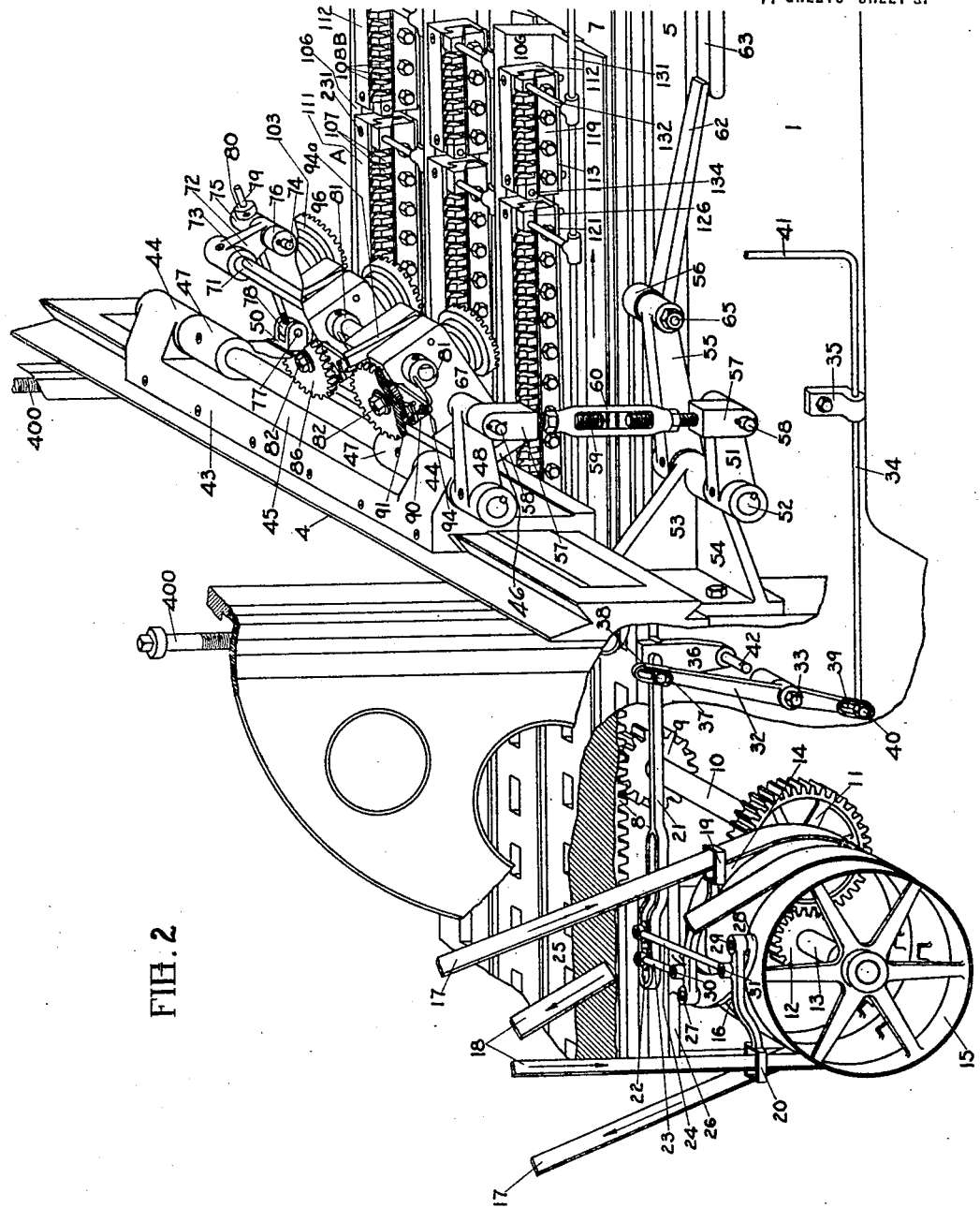

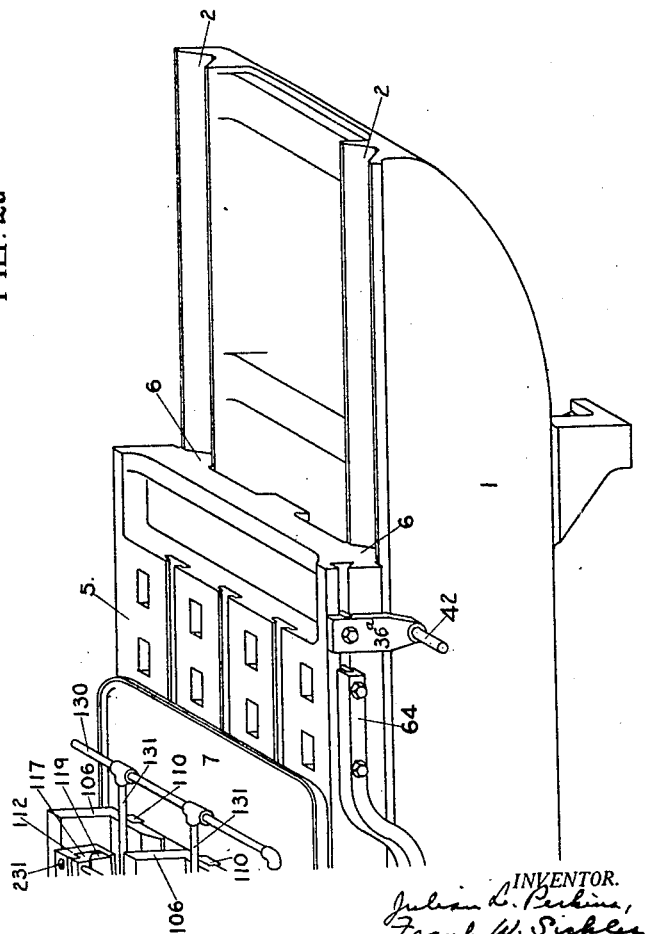

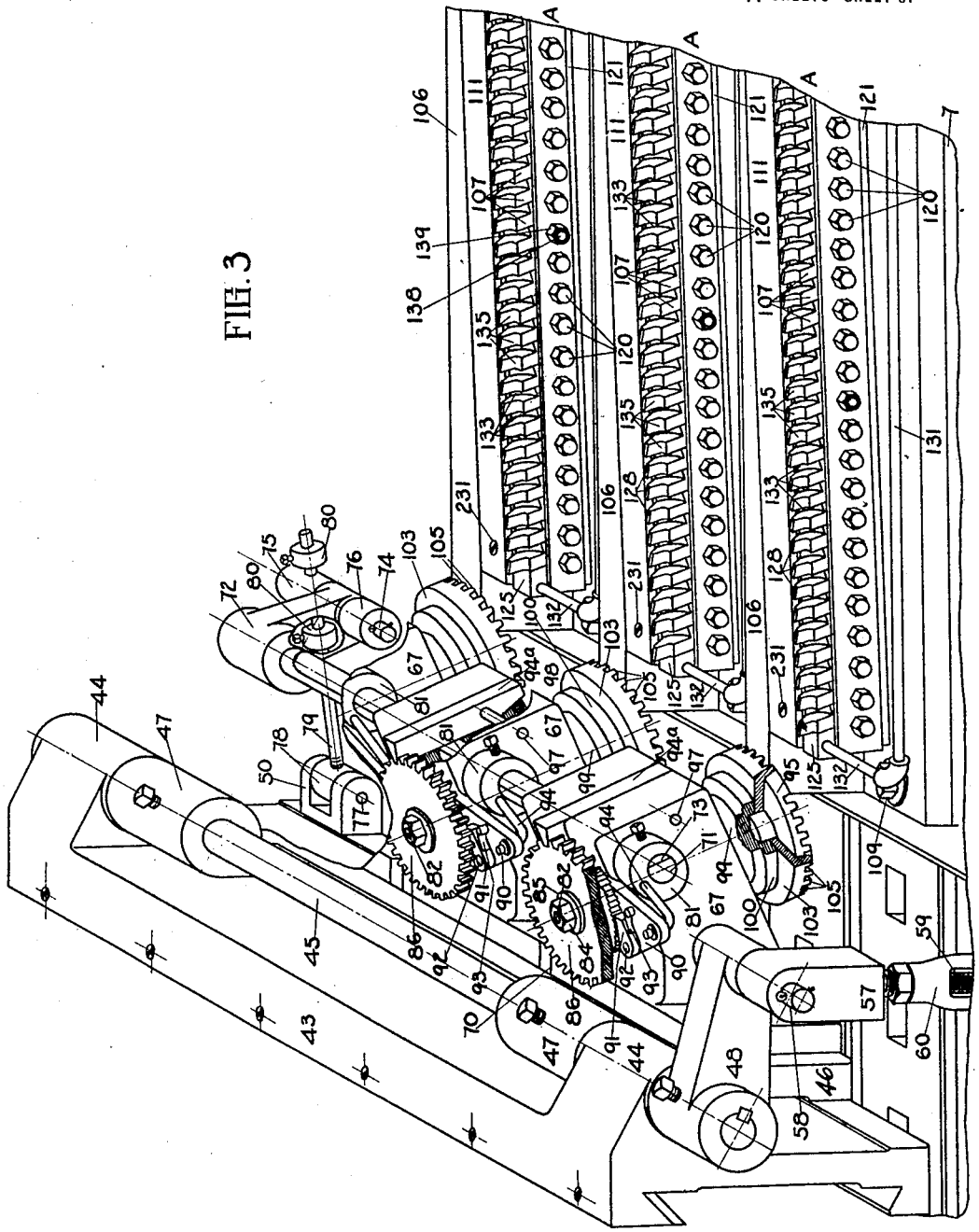

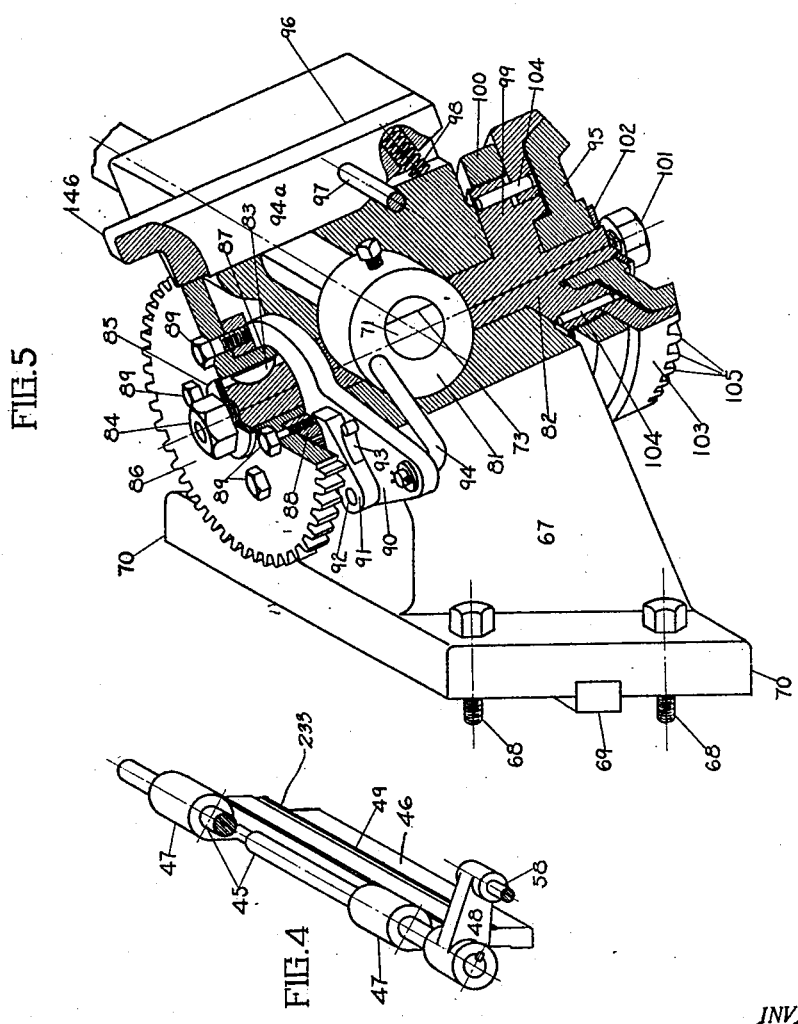

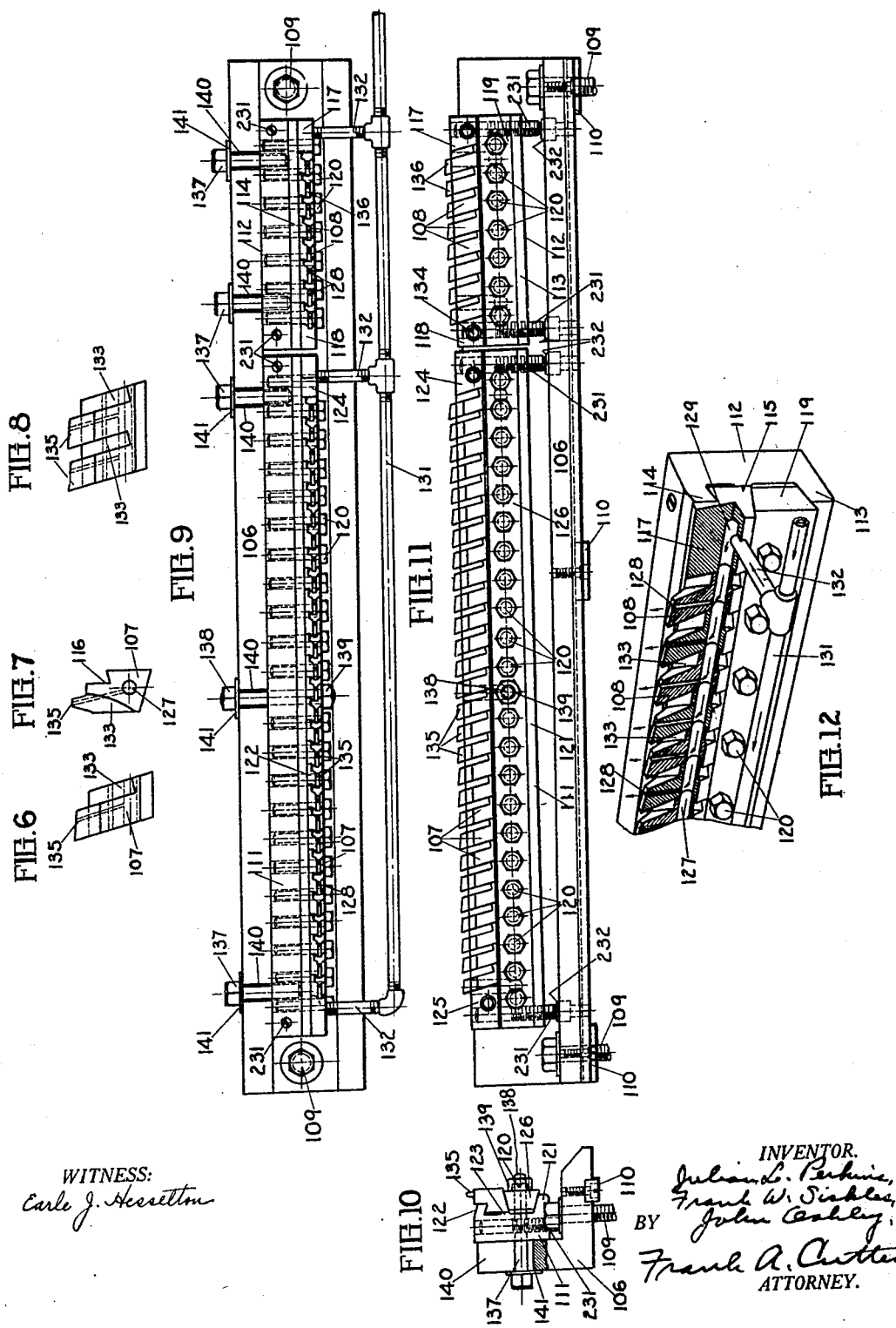

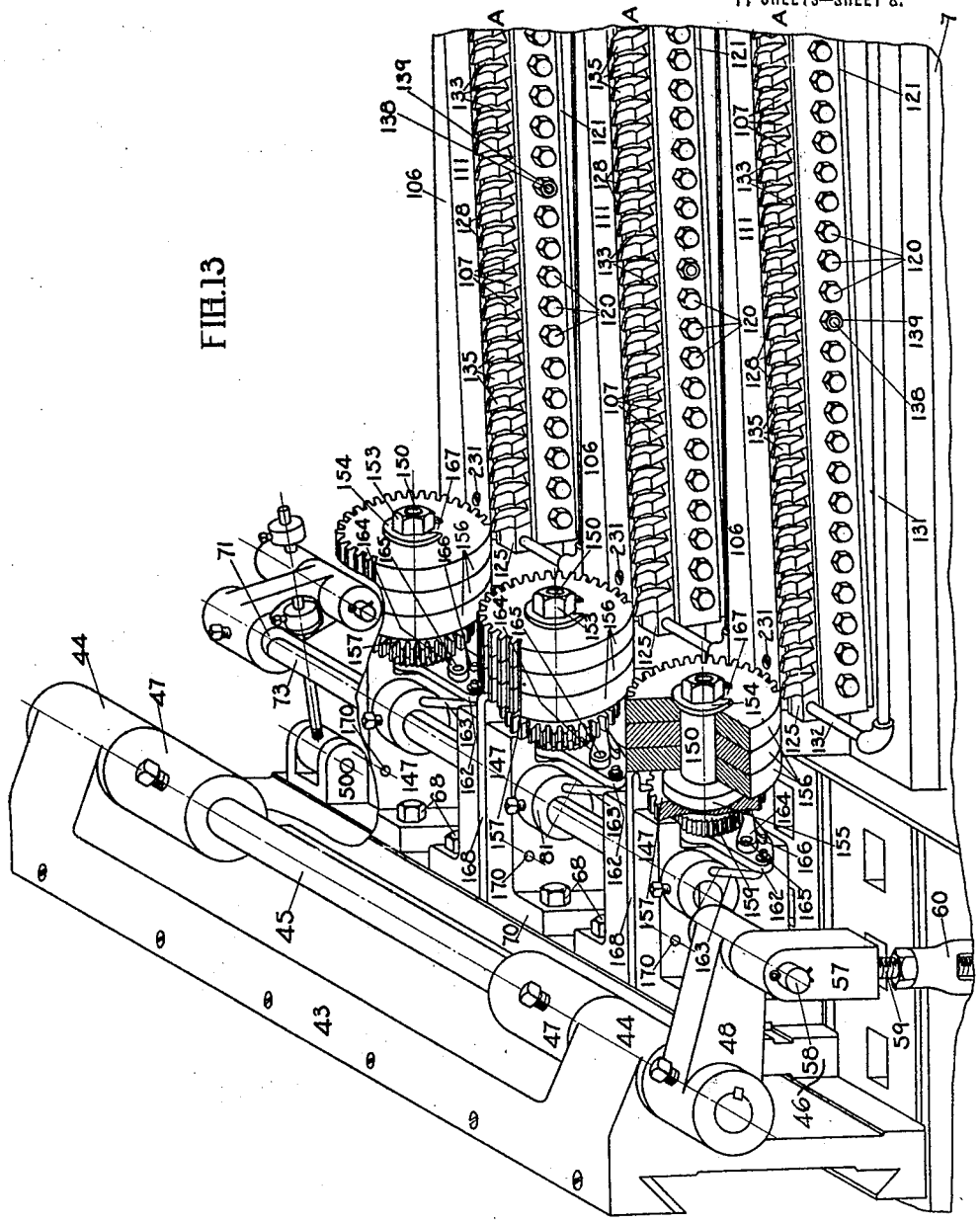

J. L. PERKINS, F. W. SICKLES, AND J. OAKLEY.
MULTIPLE GEAR CUTTING MACHINE.
APPLICATION FILED OCT. 28, 1919.
1,409,766.
Patented Mar. 14, 1922.
11 SHEETS—SHEET 9.
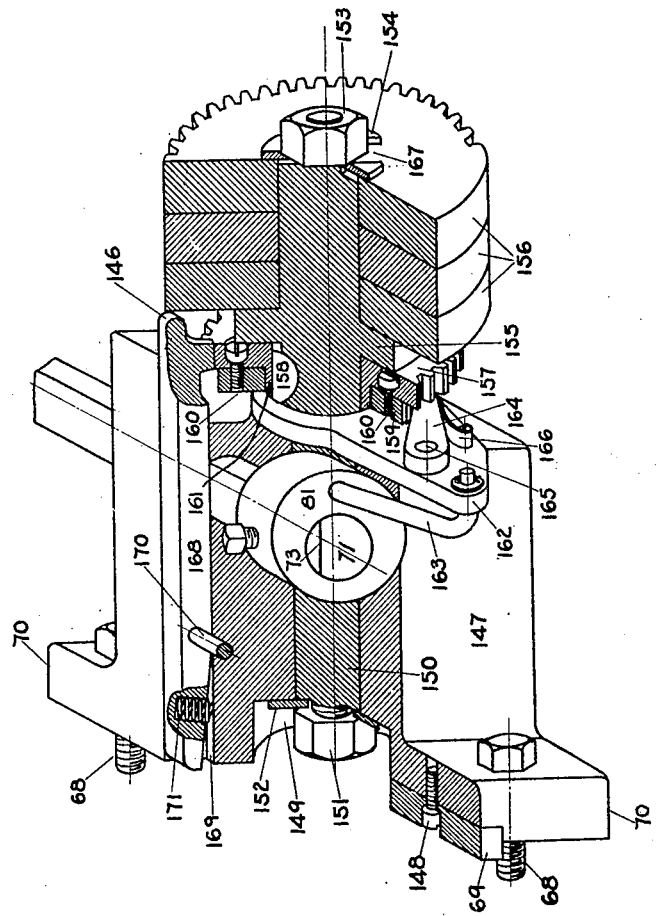
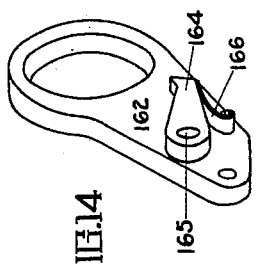
WITNESS:
INVENTOR.
BY
ATTORNEY.

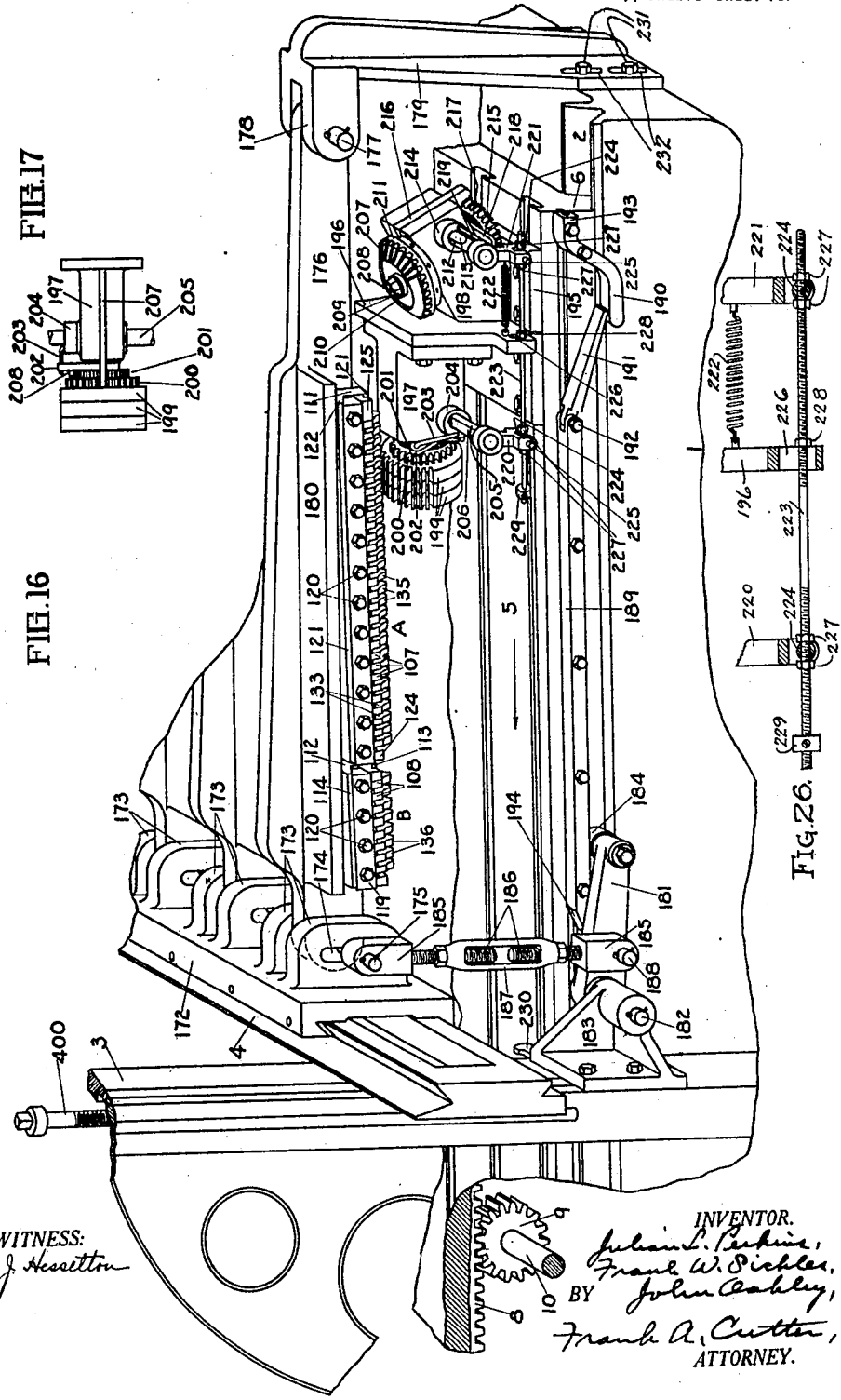

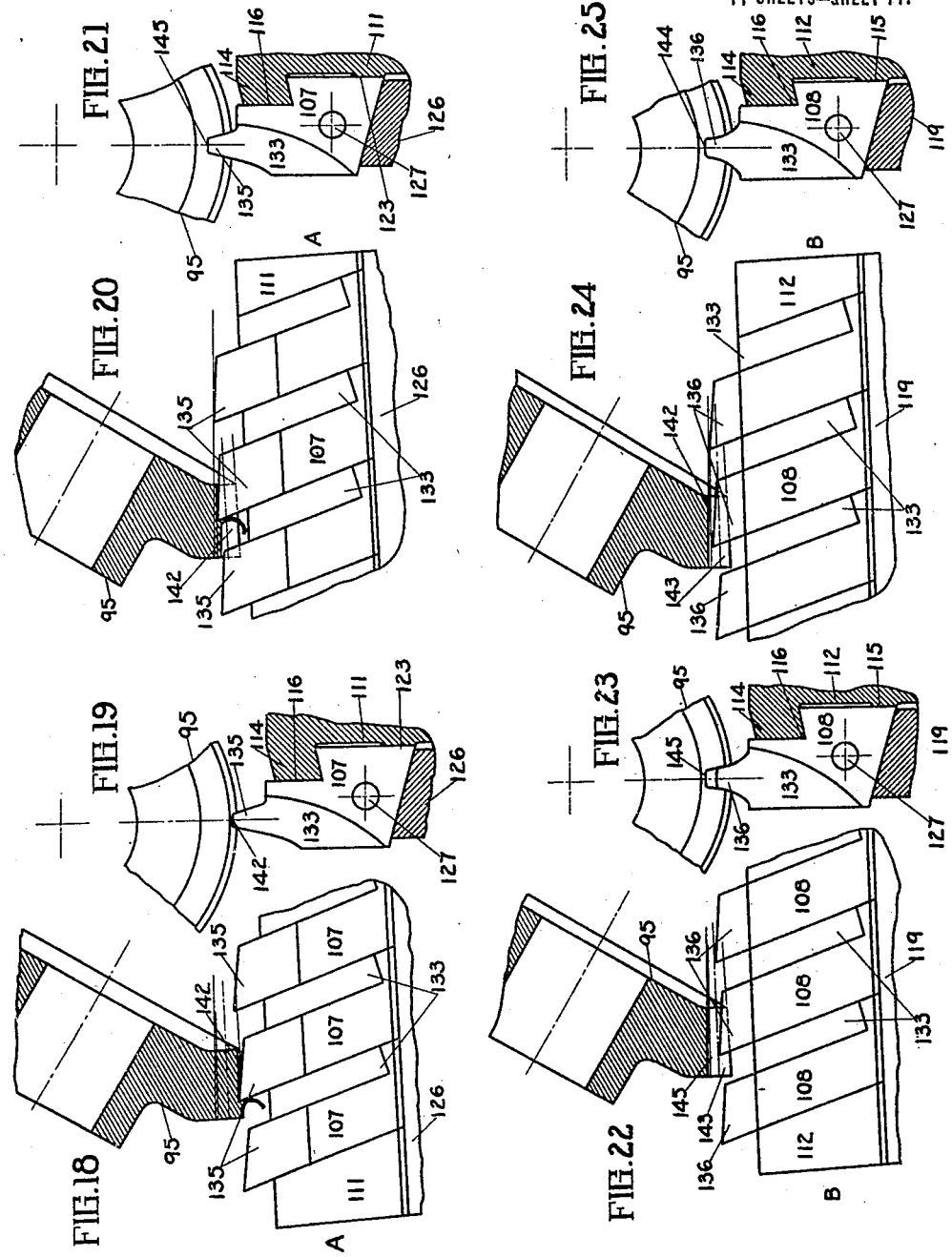

UNITED STATES PATENT OFFICE.

JULIAN L. PERKINS, OF WEST SPRINGFIELD, AND FRANK W. SICKLES AND JOHN OAKLEY, OF SPRINGFIELD, MASSACHUSETTS, ASSIGNORS TO PERKINS APPLIANCE COMPANY, OF SPRINGFIELD, MASSACHUSETTS, A CORPORATION OF MASSACHUSETTS.

MULTIPLE-GEAR-CUTTING MACHINE.

1,409,766.  Specification of Letters Patent.  Patented Mar. 14, 1922.

Application filed October 28, 1919. Serial No. 333,987.

*To all whom it may concern:*

Be it known that we, JULIAN L. PERKINS, a resident of West Springfield, in the county of Hampden and State of Massachusetts, FRANK W. SICKLES, a resident of Springfield, in said county and State, both citizens of the United States of America, and JOHN OAKLEY, a subject of the King of England, residing in said Springfield, Massachusetts, have invented a new and useful Multiple-Gear-Cutting Machine, of which the following is a specification.

Our invention relates to improvements in machines for cutting bevel-gears, spur-gears, racks, and the teeth in other elements of a more or less similar nature, and consists broadly and generally of work-holding means and operating mechanism therefor, automatic indexing means or mechanism for the work, the work-holding means here being automatically indexed, roughing or stocking and finishing, cutting or broaching members or elements of peculiar construction, and mechanism for forcing said elements through said work, or feeding the latter to the former, or moving it in operative relation thereto, the work being stationary and the cutting or broaching elements being movable, in the first case, and the work being movable and the cutting or broaching elements stationary, in the second case, together with the necessary adjusting means, and such other auxiliary and subsidiary means, mechanism, parts, and members as may be necessary or desirable in order to render the machine complete and serviceable in every particular, all as hereinafter set forth.

The primary object of our invention is to provide a machine which is capable of cutting one or a plurality of gear blanks, which machine, while comparatively simple in construction and operation, is strong and durable, automatic in its action, has superior facilities whereby the cutting or broaching members or elements can be kept in order, and cuts the teeth in the gear blanks with great accuracy. This machine is comparatively inexpensive, as well as simple, in construction and operation.

We prefer to employ in our machine one or more (usually the full complement which the machine will carry) compound broaches or cutters, each made up of holding means and a row of teeth or cutting units therein, such units being readily removable therefrom and replaceable therein. There is a set of roughing or stocking cutting units in said holding means and a set of finishing cutting units therein behind said stocking cutting units. These cutting units may be easily and cheaply constructed, and they can be quickly changed whenever necessary. It appears, therefore, that each compound cutter comprises a roughing or stocking cutter in front and a finishing cutter behind, the cutting units of said stocking and finishing cutters being independent and separable.

Being separable cutting units they possess advantages inherent or due to that fact. With them a great amount of work can be performed in a given time, and the work done by said cutting units is accurate, because they are arranged or backed up, so to speak, so that the cutting strain is on the units themselves, when the compound cutter is engaged in active operation, with the result that the gears cut therewith have very finely finished teeth. Another reason why we are able to produce gear teeth of great accuracy and smoothness of surface finish is because of the small amount of material which it is necessary for each finishing cutting unit to remove. Each following finishing cutting unit enlarges the cut made by the preceding finishing cutting unit, consequently practically all chance of error or irregularity due to any leading finishing cutting unit is removed and prevented from appearing upon or in the finished product. The last finishing cutting unit, which makes the final cut, has very little stock to remove and consequently lasts a longer time without requiring to be reground or replaced, which is an important advantage because this is the unit that determines the final size and shape of the cut.

Inasmuch as each stocking cutting unit and each finishing cutting unit makes but one cut at each stroke of the compound cutter of which such units constitute parts, there is ample time for the units to cool, and the wear of the same is minimized.

As a time-saving element in our machine, provision is made to index the work while the compound cutter or cutters are returning to initial position, or while the work is returning to initial position in the event it be the latter which is reciprocated instead of the cutters.

Parenthetically it may be stated that, with the finishing cutting units directly back of the roughing or stocking cutting units, it is possible to stock and finish the work at one stroke.

When the finishing cutter in any compound cutter in our machine becomes worn, it is necessary to replace only two or three of the last cutting units in order to maintain the standard size and shape of the gear-tooth slot cut thereby.

It is not necessary to change the roughing cutters, when cutting gears having different numbers of teeth of the same pitch, but only to change the finishing cutters, replacing the latter with finishing cutters having cutting units the curvatures of which correspond with the curvatures of the gear-tooth slots.

The roughing cutters are usually longer than the finishing cutters.

The type of the gear tooth cut by this machine agrees exactly with that of the finishing cutter, or with the cutting contour thereof.

As a further object mention may be made of the provision whereby the gear blanks are indexed automatically and in such a manner as to space properly the gear teeth at the completion of each cut until all of the teeth are cut in said blanks.

Another object is to provide means whereby the cutting units in the roughing cutters are all of the same size, length, and shape, and the cutting units in the finishing cutters are all of the same size, length, and shape. This materially reduces the initial cost of the cutters and also the cost of repairing them and of sharpening the cutting units.

This machine may be termed a single-cut machine for the reason that a single stroke produces a complete gear-tooth slot, and this in spur-gears, racks, and the like, and bevel-gears. The bevel-gears cut with the machine while not true generated gears, are sufficiently accurate for a great variety of purposes, so that the inability of said machine to cut this type of gear is of comparatively little importance and does not seriously detract from the value of the machine.

Still another object is to provide means for tilting or inclining the roughing and finishing cutters to produce the required depth of slot, in consequence of which it is practicable to employ the cutting units of uniform size and shape, of which mention has been made, and the advantages of employing which have been set forth.

In its broader aspect the invention is not restricted to inclined or tilted cutters, or to cutters having independent, separable cutting units, since various other forms of cutting elements, provided they be of the broach type, may be employed, such, for example, as cutters having integral cutting units or teeth of gradually increasing height from front to rear, like the ordinary broach, or integral teeth of the same height, in which latter event the cutters would have to be tilted. The new compound cutters are greatly to be preferred, nevertheless, for reasons now plainly to be seen.

Other objects and advantages will appear in the course of the following description.

A preferred embodiment of our invention, whereby we attain the objects and secure the advantages of the same, is illustrated in the accompanying drawings, and we will proceed to describe said invention with reference to said drawings, although it is to be understood that the form, construction, arrangement, etc. of the parts and members in various aspects are not material, and may be modified without departure from the spirit of the invention.

In the drawings, in which similar characters of reference designate similar parts throughout the several views, Figures 1 and 1ª combined form a perspective view of the essential parts of a multiple gear-cutting machine which embodies a practical form of our invention as aforesaid, this machine being designed for cutting bevel-gears, and the compound cutters being about to make a set of cuts in the gear blanks, having left their initial position, as indicated by the associated arrow in Fig. 1; Figs. 2 and 2ª combined form a similar view, but show the work-holding elements raised, and said cutters on their way toward initial position, as indicated by the associated arrow in Fig. 2; Fig. 3, is an enlarged, perspective view of the work-holding and indexing elements and the operating mechanism therefor, together with adjacent portions of the compound cutters, the parts being disposed as in Fig. 1; Fig. 4, a perspective view of certain of the work-supporting members; Fig. 5, an enlarged, perspective view of one of the work-holders and of parts of the indexing mechanism showing the same in detail; Fig. 6, an enlarged, side elevation of a cutting unit detached; Fig. 7, an enlarged, end elevation of such unit; Fig. 8, an enlarged, side elevation of a double cutting unit or two such units united or integral; Fig. 9, an enlarged, top plan of one of the compound cutters; Fig. 10, an end elevation of said cutter, the oil conduits shown in the preceding view being omitted, (this is really a left-hand elevation of Fig. 11); Fig. 11, a front elevation of said cutter, without said conduits; Fig. 12, an enlarged, perspective view of the major portion of the finishing cutter of said compound cutter, parts being in section; Fig. 13, a perspective view of so much of the machine as is necessary to show the same equipped for cutting spur-gears and showing such equipment, such view being generally similar to Fig. 3; Fig. 14, an enlarged, perspective view of certain of the indexing parts employed in connection with the indexing mechanism for the machine as illustrated in Fig. 13; Fig. 15, an enlarged, perspective view, in partial section, of parts of said last-named indexing mechanism and one of the spur-gear work holders; Fig. 16, a perspective view of a machine wherein the work is reciprocated and the cutting elements are non-reciprocating; Fig. 17, a bottom plan of parts of the indexing mechanism employed in the Fig. 16 machine; Fig. 18, an operative view showing the cut made by the second leading cutting unit of any roughing cutter, a fragmentary portion of which latter is shown in side elevation and a bevel-gear blank in section; Fig. 19, an end elevation of the parts shown in Fig. 18 as viewed from the right, parts of the roughing cutter being in section; Fig. 20, a view similar to Fig. 18, but showing the roughing cutter about to complete its cut; Fig. 21, an end elevation, in partial section, of the parts shown in Fig. 20; Fig. 22, an operative view illustrating the early operation of one of the finishing cutters, the view being generally similar to that appearing in Fig. 18; Fig. 23, an end elevation, in partial section, of the parts shown in Fig. 22; Fig. 24, a view similar to Fig. 22 except that the finishing cutter is about to complete the gear-tooth slot; Fig. 25, an end elevation, in partial section, of the parts shown in the preceding view and, Fig. 26, an enlarged detail of a portion of the indexing mechanism employed in the construction illustrated in Fig. 16.

We will first describe in detail the machine having the equipment for cutting bevel-gears, which is illustrated in the first twelve views, together with the operation of such machine.

The frame of the machine, or so much of it as required for a full understanding of the invention, comprises a horizontal bed 1 having therein longitudinal, V-shaped grooves or ways 2—2, and provided with uprights 3—3, a cross-piece, support, or cross-head 4, secured to the faces of said uprights, and a reciprocating platen or carriage 5 having bottom V-shaped members 6—6 to slide in said grooves or ways. The support or cross-head 4 is secured to the uprights 3 by means which render such cross-head adjustable vertically, such means being a screw-jack, of which parts 400—400 appear, such as is common in planer construction. A bed-plate 7 is mounted on and securely attached to the carriage 5. On the underside of the carriage 5 is a rack 8. The rack 8 and the carriage 5 are reciprocated on the bed 1 by means of a pinion 9 which intermeshes with said rack. The pinion 9 is secured to a suitably journaled shaft 10, to which is also secured a gear 11. The gear 11 intermeshes with a pinion 12 which is secured to a suitable journaled driving shaft 13. The shaft 10 and the shaft 13 extend transversely beneath the bed 1 and behind the vertical plane of the cross-head 4. Two pulleys 14 and 15 are loosely mounted on the shaft 13, and a pulley 16 is secured to said shaft between said first-named pulleys. The pulley 16 is driven by means of a belt 17 in the direction to actuate the carriage 5 toward the left, through the medium of the shaft 13, the pinion 12, the gear 11, the shaft 10, the pinion 9, and the rack 8—see the arrows on said belt. And the pulley 16 is driven by means of a belt 18 in the direction to actuate the carriage 5 to the right, through the medium of the same parts and members as before—see the arrows on said belt. This mechanism for reciprocating the carriage 5 is of ordinary construction and merely illustrates one means for performing such operation.

The shipper mechanism for the belts 17 and 18, whereby said belts are shifted on the pulleys 14, 15 and 16, comprises a shipper 19 for the belt 17, a shipper 20 for the belt 18, a reciprocating bar 21 having therein a cam-groove 22, rods 23 and 24, and two rollers 25. The terminal of the bar 21 in which the cam-groove 22 is located is supported on a bracket 26 which is attached to the frame 1. One end of the shipper 19 is pivotally attached at 27 to an arm 28 that extends outwardly from the bracket 26, and said shipper extends forwardly from said arm. One end of the shipper 20 is pivotally attached at 29 to the arm 28, and said shipper extends to the left from said arm. The rolls 25 are carried at the inner ends of the rods 23 and 24, and are in the cam groove 22. The outer end of the rod 23 is pivoted at 30 to the shipper 19, and the outer end of the rod 24 is pivoted at 31 to the shipper 20.

The arrangement of parts and the shape of the cam-groove 22 are such that, when the bar 21 is actuated to the right, the rolls 25 are carried inwardly toward the vertical part of the bracket 26, and, through the medium of the rods 23 and 24, cause the shippers 19 and 20 to swing on their pivots 27 and 29, respectively, in the same direction, with the result that the belt 17 is shifted from the tight pulley 16 onto the loose pulley 14 and at the same time the belt 18 is shifted from the loose pulley 15 onto said tight pulley, and the carriage 5 is caused to move to the right, as in Figs. 2 and 2ª; and that, when said bar is actuated to the left, said rolls are forced outwardly or away from said vertical part of said bracket, and, through the medium of said rods, cause such shippers to swing on said pivots in the same direction, with the result that the belt 17 is shifted from the loose pulley 14 onto the tight pulley and at the same time the belt 18 is shifted from said tight pulley onto the loose pulley 15, and said carriage is caused to move to the left, as in Figs. 1 and 1ª.

The bar 21 is actuated by means of a lever 32 pivoted at 33 to the adjacent side of the bed 1, a horizontal rod 34 arranged to slide in a lug 35 which is attached to said side of said bed, and dogs 36 and 36ª attached to the corresponding side of the carriage 5. The upper terminal portion of the lever 32 has a longitudinal slot 37 therein to receive a pivot 38 by means of which said lever and the bar 21 are operatively connected. The lever 32 also has a longitudinal slot 39 in the lower terminal portion thereof to receive a pivot 40 by means of which said lever and the rod 34 are operatively connected. The arm 34 has at its free terminal an upwardly projecting member 41 which is in the path of two forwardly or outwardly extending members 42 which comprise parts of the dogs 36 and 36ª. The dogs 36 and 36ª are so located on the carriage 5, and the projection 41 is so located relative to said dogs, that, when said carriage approaches the left-hand end of its travel, the member 42 of the dog 36ª encounters said projection and actuates it with the rod 34 in the same direction that said carriage is moving, with the result that the lever 32 is rocked on its pivot 33 in such a way as to draw the bar 21 to the right and so shift the belts 17 and 18 in the manner necessary to reverse the carriage; and, when said carriage approaches the right-hand end of its travel, the member 42 of the dog 36 encounters said projection, said rod is actuated in the opposite direction, and the shipper mechanism is operated and caused to shift said belts in such a manner as to reverse said carriage a second time and cause it to travel to the left again.

This shipper mechanism is old and well known and constitutes no part of the present invention, any more than does the driving mechanism, or the general construction of the parts and members hereinbefore specifically described, except as said mechanism and parts and members may be combined in a broad sense with the new features, or as elements in the invention as a whole.

The essentially new elements comprise the stocking and finishing cutters, the supporting or holding means for the work, that is, the gear blanks which are to be cut by said cutters, and indexing means, that is to say, the means whereby the said blanks are partially rotated after each gear-tooth slot is cut, to present uncut portions of the blanks for the cutting of the next slots therein.

Preferably there are a number of compound cutters arranged side by side, and a corresponding number of holders and indexing devices for the gear blanks. Inasmuch as the compound cutters are all alike and the holders and indexing devices are all alike, it will be necessary generally to describe in detail only a single compound cutter and one of the holders and one of the indexing devices. The compound cutters are mounted in parallel relation on the bed-plate 7, and travel with the carriage 5, while the holders and indexing devices are supported from and by the crosshead 4, in line with or in proper relation to said cutters. Means are required for raising the gear blanks out of the paths of the compound cutters, at the end of the active stroke of said cutters, so as to enable the latter to return to initial position without contacting with said blanks, and this same means is utilized to operate the indexing devices and is a part of the indexing mechanism. This lifting and indexing or index-operating means or mechanism is automatically operated in the manner hereinafter explained.

The tools or implements employed for cutting the gear teeth or the gear-teeth slots are in the nature of broaches, and each of these is what we term a compound cutter which comprises a roughing or stocking cutter and a finishing cutter, as we have previously observed. The former is made up of a series, set, or plurality of cutting units arranged in a row, and the latter is made up of a series, set, or plurality of cutting units arranged in a row. The finishing cutter is behind and in exact alignment with the roughing cutter. The roughing cutting units are all separable and all of the same size and height and shape, and the same is true of the finishing cutting units. A fuller description of the compound cutters will be left until later.

Mounted on the front of the cross-head 4 is a horizontal plate 43 which is provided on top at the ends with bearings 44—44. Journaled in the bearings 44 is a rock-shaft 45, and depending from said shaft is an oscillatory plate, clapper, or hanger 46, said hanger having lugs 47—47 at the top which are secured to said rock-shaft inside of the bearings 44. A rocker-arm 48 is secured to the rock-shaft 45 outside of the forward bearing 44, said arm extending to the right from said shaft. Normally the hanger 46 stands vertically and is in contact with the plate 43 behind, which plate forms an abutment for said hanger. There is a longitudinal groove 49, Fig. 4, in the face of the hanger 46 about mid-way between the top and bottom edges thereof, and the lower rear corner of said hanger is cut out, as shown at 233 in Fig. 4, to accommodate a lug 50 which projects from the face of the plate 43. In Figs. 1, 2, 3, and 13 the rear end portion of the hanger 46, in which is the cut-away part at 233, is broken off, with other parts and members carried by said hanger, in order to disclose the lug 50 and connected members.

The terms "front" and "rear", or equivalent terms, and their derivatives, as used herein, generally refer to the side of the machine which is nearer to and to that which is farther from the observer, respectively, on the one hand, and to the right-hand side or end of the parts and members and the left-hand side or end of the parts and members, respectively, transversely of the machine, on the other hand. There is an exception made to this general rule, however, when the direction of movement of the carriage 5 and the parts and members carried thereby is referred to, since the carriage is said to advance when it moves toward the work or to the left, or such movement is described by some equivalent or similar term or terms, although the carriage is then moving toward what we here term the rear end of the machine.

A rocker-arm 51 is secured to a short, horizontal rock-shaft 52 at the outer end thereof, said arm being directly below the arm 48. The rock-shaft 52 is journaled in a bearing 53 at the right-hand end of a bracket 54 which is secured to the face of the front upright 3 below the cross-head 4. A rocker-arm 55 is secured to the rock-shaft 52 at the inner end thereof, and extends to the right from said shaft. The bearing 53 is between the rocker-arms 51 and 55 or the hubs thereof. The free end of the rocker-arm 55 is equipped with a roller 56 on the inside. There is an approximately vertical connection between the rocker-arms 48 and 51. This connection, in the present case, consists of upper and under heads 57 pivotally attached at 58—58 to the rocker-arms 48 and 51, and screw-threaded extensions 59 which are connected by a turn-buckle 60. By means of the turn-buckle 60 the distance between the pivots 58 may be increased or decreased, so that the proper adjustment of the parts may be readily effected.

Upward movement of the rocker-arm 55 actuates the rock-shaft 52 and the rocker-arm 51 and causes the forward end of the rocker-arm 48 to be swung upwardly, through the medium of the connection between said arms 51 and 48, and the rock-shaft 45 is then actuated in such a manner as to swing the hanger 46 forward and upward away from the face of the plate or abutment 43, thus elevating or raising whatever may be carried by said hanger. The downward movement of the rocker-arm 55 causes or permits the hanger 46 to be returned to position in contact with the abutment plate 43, and the parts and members carried by said hanger to be lowered, the medium through which said hanger is swung downwardly and rearwardly, or is permitted to do so, when said rocker-arm swings downwardly, being the intervening connections between said hanger and rocker-arm, as in the first instance. The downward movement of the rocker-arm 55 with its roller 56 is limited by the abutment 43 with which the hanger 46 then contacts.

The means for operating the rocker-arm 55, so that it will cause the hanger 46 to be swung forwardly and upwardly, consists of a rail 61, a movable trip or switch 62, and a rail 63. The rail 61 is a horizontal member secured to the front side of the carriage 5 in such a position that the left-hand end of said rail can clear the roll 56, when said carriage arrives at the right-hand end of its travel. The rail 63 is also a horizontal member which is attached to the same side of the carriage 5 as is the rail 61, but said rail 63 is on a lower horizontal plane than is said rail 61, and has an upwardly and forwardly offset part 64 that is directly attached to said carriage. The left-hand end of the switch 62 is pivoted at 65 to the right-hand end of the rail 61. The switch 62 is long enough to enable the right-hand terminal thereof to rest on the rail 63.

As the carriage 5 moves from right to left, the rail 61 passes over and beyond the roll 56, the switch 62 rides on to said roll and is swung upwardly out of contact with the rail 63, and the latter passes beneath said roll. The length of the rail 63 and the movement thereof with the carriage 5 are sufficient to permit the switch 62 to ride off of the roll 56 and drop down again onto said rail by the time said carriage arrives at the left-hand end of its travel. The roll 56 is now in the path of the free terminal of the switch 62 when said switch is carried to the right with the carriage 5, therefore, as said carriage moves to the right, after being reversed, said switch is carried beneath said roll and elevates the same, due to the fact that the switch has a downward incline to the right from its pivotal point to its other end when the latter rests on the rail 63. The rocker-arm 55, which carries the roll 56, is swung upwardly with said roll until the rail 61 passes beneath said roll. Then the roll 56 is maintained in its elevated position until the rail 61 passes from beneath said roll, which it does as the carriage 5 approaches the right-hand end of its travel. The upward incline of the switch 62 is sufficient to produce the required amount of movement, on the part of the hanger 46, to raise the parts and members carried by said hanger to the extent required, and the length of the rail 61 is sufficient to maintain the elevated parts and members in raised position the required length of time. When the rail 61 passes from beneath the roll 56, as it does at the end of the right-hand travel of the carriage 5, said roll is permitted to drop behind said rail. The roll 56 drops low enough to permit the rail 61 to pass over it when the carriage 5 again moves to the left. When the rail 61 frees the roll 56 the hanger 46, with its attached and connected parts and members, swings down by gravity against the abutment 43. The left-hand end of the rail 61 is beveled from above downwardly and toward the left, as represented at 66, in order to enable said rail to ride from under the roll 56 without producing a sudden jar or shock to the mechanism operated and controlled by the rocker-arm 55, as would be the case if the inclined path afforded by the bevel at 66 were not provided and said roll were permitted to drop abruptly from the top of said rail.

The work-holding and indexing mechanism or mechanisms, which will next be described, are supported from and carried by the oscillatory hanger 46, and they are automatically operated by or from the carriage 5 in the manner already explained or so far as the movement of the plate 46 is concerned.

Although three compound cutters and the same number of work holders and indexing devices are shown in the machine now being described, also in the machine equipped for cutting spur-gears, it is evident that such number may vary. There will more frequently be a greater than a less number of compound cutters and holders and indexing devices.

Three blocks 67 are rigidly attached to and held in place against the face of the oscillatory hanger 46 by means of bolts, as 68 in Fig. 5, and a spline 69 which fits the slot or groove 49 in said hanger and a corresponding slot or groove in the back side of said blocks. Each block 67 has a flange 70 on each side through which the bolts 68 pass. A horizontal rock-shaft 71 extends through the blocks 67, is parallel with the hanger 46, and has secured thereto at the rear terminal thereof a rocker-arm 72. The rock-shaft 71 is mutilated or flattened on its front side, as represented at 73. The rocker-arm 72 extends downwardly from the rock-shaft 71, and a short shaft or spindle 74, which is parallel with said rock-shaft, is journaled in the lower terminal of said rocker-arm. The spindle 74 has a head 75 which is behind or beyond the rocker-arm 72, and there is a collar 76 secured to said spindle in front or inside of said rocker-arm. Pivotally connected at 77 with the lug 50, which latter is bifurcated, is a head 78 of a rod 79, which rod extends forwardly from said head through and beyond the spindle head 75.

The rod 79 has a screw-threaded connection with its head 78, so that the proper adjustments of the parts operated and controlled by said rod may be made, or, in other words, so that said rod may be caused to project a greater or less distance from its head and thereby change the position and movement of the flat part 73 of the rock-shaft 71 relative to the parts operated by such flat part. Collars 80—80 are secured to the rod 79 both sides or in front of and behind the spindle head 75. The collars 80 cause the head 75 to move back and forth with the rod 79, and such movement on the part of said head is transmitted through the spindle 74 to the rocker-arm 72, so that the latter swings forward and back with said head and rocks the rock-shaft 71. At such time the spindle 74 is partially rotated in the rocker-arm 72. The collars 80 are adjustable on the rod 79.

When the hanger 46 is actuated forward away from the abutment 43, the members supported on and by said hanger are carried forwardly and upwardly with the latter, and the rock-shaft 71 is actuated through the medium of the rocker-arm 72 and the rod 79, one end of which latter is connected with the fixed lug 50, the head 75 partially rotating with the spindle 74 in said rocker-arm, and the head 78 partially rotating on and with the pivot 77. This forward movement of the parts causes the rocker-arm to be swung rearwardly or inwardly at the bottom end and thereby rock the rock-shaft 71 from left to right, so that the top edge of the flat part 73 of said shaft is advanced or thrust forwardly. Upon the return of the hanger 46 to normal or initial position, the rod 79 forces forwardly or outwardly the bottom of the rocker-arm 72, and so restores the flattened part 73 of the rock-shaft 71 to its original or initial position which more nearly approximates the vertical. This is the operating mechanism for the indexing devices, and is itself operated by the hanger 46. Said hanger is operated by the roll 56 and the rail elements therefor, which elements are carried by the carriage 5.

An eccentric collar 81 is secured to the rock-shaft 71 in front of each block 67. The collar 81 is made eccentric rather than concentric in order to save stock, since the eccentric collar for the present purpose need not be so large in diameter as a concentric collar would need to be.

Journaled in each block 67 behind the rock-shaft 71 is an arbor 82. The arbor 82 extends through and beyond the top and bottom of its block 67, and has such an incline as to enable a gear blank to be carried by said arbor in such position as to permit the compound cutters to cut the teeth in said blank at the proper angle. What is meant here by the proper angle is the angle which the inner wall, or what may be termed the bottom, of any gear-tooth slot cut by one of the compound cutters, forms with the axis of the gear blank.

Mounted on the upper terminal of each arbor 82, and secured thereto by means of a key 83, a nut 84, and a washer 85, is a toothed, lock wheel 86. The lock wheel 86 has a hub 87 which extends to the top of the associated block 67 and rides thereon. A ratchet-wheel 88 is secured to the underside of the wheel 86 by means of bolts 89 which pass through said last-named wheel into said first-named wheel. Mounted on the hub 87 between the top of the block 67 and the ratchet-wheel 87 is an oscillatory support or carrier 90 for a pawl 91. The pawl 91 is pivoted at 92 to the carrier 90, and the free end of said pawl is in position to engage the teeth of the ratchet-wheel 88, a spring 93 being arranged on said carrier to urge said pawl into engagement with said teeth. The carrier 90 is oscillated by the adjacent eccentric collar 81, with which collar said carrier is operatively connected by means of a connecting rod 94— see more particularly Fig. 5.

The arrangement and construction of these parts are such that, as the collar 81 is rocked with the rock-shaft 71, at the time the latter is actuated by the forward swing of the hanger 46, the carrier 90 is forced rearwardly by the connecting-rod 94 a distance which enables the pawl 91 to engage a new tooth on the ratchet-wheel 88. When the hanger 46 is returned to initial position and thereby returns the rock-shaft 71 and the collar 81 to initial position, the connecting-rod 94 draws the carrier 90 forward again, with the result that the pawl 91 causes the ratchet-wheel 88 and the lock wheel 86 to be rotated a distance equal to that which is between two of the ratchet-wheel teeth, or in any event equal to the distance between two of the lock-wheel teeth. The carrier 90 oscillates on the hub 87. The arbor 82 is thus intermittently carried around with and by means of the lock wheel 86.

It is necessary to provide a latch or detent, as 94$^a$, for each wheel 86 in order that said wheel with its arbor shall be held securely in position during the cutting operation, inasmuch as said arbor carries a bevel-gear blank, as 95, during such operation. Each detent 94$^a$ is received in an approximately vertical slot 96 in the front of its block 67, and is pivoted at 97 to said block. A spring 98 is arranged between the innermost side of the slot 96 and the tail of the detent 94$^a$, or that portion of said detent which extends below the pivot 97, and urges the upper terminal of said detent into engagement with the teeth of the lock wheel 86. The inner edge of the detent 94$^a$, at a point intermediate of the horizontal plane of the pivot 97 and the part of such detent which engages the lock wheel 86, is in contact with the flattened side 73 of the rock-shaft 71. When the rock-shaft 71 is normally disposed, which is the case when the hanger 46 is in contact with the abutment 43, the detent 94$^a$ is in full contact with the flat side 73 of said shaft, that is to say, said detent contacts with said flat side throughout the entire width of the latter. When the hanger 46 is actuated away from the abutment 43, and the rock-shaft 71 is partially rotated as a result of the movement of said hanger 46, the lower edge of the flat surface 73 is advanced or thrust forward, and said edge then rocks the detent 94$^a$ on the pivot 87 and against the resiliency of the spring 98 out of engagement with the lock wheel 86. This action occurs soon after the carriage 5 commences to return on its inactive stroke. It is while the lock wheel 86 is thus released that the carrier 90 and pawl 91 impart a partial revolution to said wheel and to the arbor 82. The detent 94$^a$ is permitted to reengage the lock wheel when the rock-shaft 71 is returned to normal position, which occurs as soon as the rail 61 passes from beneath the roll 56, as the carriage 5 arrives or is about to arrive in position to commence its active stroke. The detent is caused forcibly to engage with the wheel 86 by the spring 98, and said detent engages the new teeth or enters the tooth space newly presented by the action of the pawl and ratchet.

Each arbor 82 is provided with a flange 99 which is received against the underside of the block 67 in which said arbor is journaled. The periphery of the flange 99 is screw-threaded, and a collar 100 is connected therewith. The gear blank 95 is received on the lower terminal portion of the arbor 82, where it is held by means of a nut 101 and a washer 102. The gear blank 95 is supported by means of a shroud 103, which is introduced between the collar 100 and said gear blank. Pins 104, which are parallel with the arbor 82, extend from the flange 99 into the shroud 103 to assist in holding the latter in position. The hub of the gear blank 95 is received in and supported by the flange 99. The shroud 103 directly engages and supports the peripheral portion of the gear blank 95, and said shroud has serrations which correspond with those that are to be cut in said blanks, and between which the compound cutter passes during the cutting operation, the projections formed by such serrations appearing at 105. The number of the projections or teeth forms 105 corresponds with the number of teeth on the lock wheel 86, and the pins 104 hold the shroud 103 in such position that one of the spaces therein between two of said teeth forms is in position to receive the compound cutter when said wheel is locked with the detent 94ª. It will be understood that the number of teeth on the wheel 86 corresponds with the number of teeth to be cut in the blank 95.

Each of the three compound cutters shown in the first machine consists of a supporting member or support 106, and a roughing or stocking cutter A and a finishing cutter B mounted on and attached to said support, and said roughing and finishing cutters comprise respectively independent, removable cutting units 107 and 108. The supports 106 are angular in cross section, and are arranged in parallel relation to each other on the bed-plate 7 lengthwise thereof, being attached to said bed-plate and securely held against independent movement of any kind by means of bolts 109 and short splines 110, as shown in Fig. 1ª. There are three splines 110 for each support 106, and they may be attached to said support by means of screws, as indicated in Figs. 10 and 11, to which special attention is directed at this time. The roughing cutter and the finishing cutter, of each compound cutter, consist in part of a long holder 111 and a short holder 112, respectively. The holders 111 and 112 and the parts and members attached thereto and held thereby are substantially alike, the principal differences being in matters of length, number of cutting units, and shape of cutting parts, so that a description of the holder 112 and parts with special reference to Fig. 12 is applicable to the holder 111 and parts. The holder 112 has a forwardly extending, longitudinal lip or flange 113 at the bottom, the top of which flange inclines from within outwardly and downwardly, and said holder has a forwardly extending, longitudinal lip or flange 114 at the top, the underside of which latter flange inclines from within outwardly and downwardly. Preferably the top of the flange 114 has a more or less similar inclination to that of the bottom of said flange for clearance purposes. On the inside face of the upright part of the holder 112 is a finished rib or backing piece 115 for the cutting units 108. Each cutting unit 108 has in what may be termed the back side thereof, at the top, a V-shaped groove 116, which extends from end to end of said unit, and is adapted to receive the acute-angled part of the flange 114. An end block 117 is provided at the front or right-hand end of the row of cutting units 108, and an end block 118 is provided at the rear or left-hand end of such row. These blocks are not as high as the cutting units 108, and their outer ends are vertical, while both ends of each of said units are oblique, but otherwise said blocks are of the same general shape and construction as said units. When the cutting units 108 and the end blocks 117 and 118 are in engagement with the flange 114, and with the inner or back sides of said units and blocks against the rib 115, the undersides of said units and blocks incline outwardly and upwardly from their lower rear or inner edges, and a wedge bar 119 is introduced between the flange 113 and said units and blocks. Bolts 120, which pass through the wedge bar 119 into the holder 112, and into which latter said bolts are tapped, force said bar tightly into place beneath the cutting units 108 and the blocks 117 and 118, and so hold said bar and cause the latter to crowd said units and blocks tightly into contact with the flange 114 and the rib 115, so that it is impossible under ordinary conditions for said units and blocks to become displaced in the slightest degree. Upon loosening the wedge bar 119, either or both end blocks can be removed and replaced, so that any of the cutting units can be taken out and replaced.

The parts and members of the holder 111 which correspond with the parts and members of the holder 112, except in the matter of length, are designated as follows: The bottom flange at 121, the top flange at 122, the backing rib at 123, the end blocks at 124 and 125, respectively, and the wedge bar at 126, the bolts for said wedge bar having the same numeral as before. The oblique ends of the cutting units 107 and 108, of which mention has been made, impart a rearward pitch or inclination to said units as a whole, toward the work, and the blocks 117 and 124, therefore, incline from the bottom upwardly and toward the left or rearwardly at their left-hand ends, while the end blocks 118 and 125 incline from the top downwardly and toward the right or forwardly at their right-hand ends.

In the absence of holding or securing means of the character just described, or of some other more or less similar character, it would be necessary to construct the cutting elements with the members, which are now separable, wholly or partially integral, or, in other words, with the cutting units integral with a shank or holder, or integral with some member which could be attached to a holder or equivalent member of some description, thus adding greatly to the initial cost and to the upkeep of the machine or of the cutting elements thereof.

Referring again to Fig. 12, it will be seen that each of the cutting units has a horizontal oil passage 127 and an upwardly directed oil passage 128 therein, the latter opening into the former at the bottom and through the top of the unit at the upper end. Each of the end blocks 117 and 118 has a horizontal oil passage 129 therein, which connects with the passage 127 in the contiguous cutting unit 108. Similar oil passages are provided in the cutting units 107 and the blocks 124 and 125. Oil is supplied through pipes 130, 131, and 132 to the end blocks 117, 124, and 125, with the passages 129 in which said pipes 132 directly communicate. The pipe 130 leads from an oil pump (not shown) by means of which the oil is forced into and through said pipe. The pipe 130 it at the front end of the compound cutters, and extends transversely of the bed-plate 7 above the same. The pipes 131 extend parallel with the supports 106, and in front of the roughing and finishing cutters, said pipes 131 being connected at their front ends with the pipe 130. The pipes 132 extend from the pipes 131 to the end blocks as already observed, or rather to the end blocks 117, 124, and 125, connection with the end blocks 118 not being made because it is not usually necessary to force the oil into both ends of the finishing cutters. Nevertheless, provision is made for connecting the end blocks 118 with the oil supply in the event it be necessary or desirable to do so. The entrances to the blocks 118 for the pipes 132 are plugged as shown at 134. Before removing any end block with which is connected one of the pipes 132, it is necessary to disconnect such pipe, or in some other manner disconnect the oil supply from said block.

The oil forced through the pipes 130, 131, and 132 into the end blocks 117, 124, and 125 passes into and through the cutting units 109, and 107, escaping at the top of such units behind, in the direction of the cutting stroke of said units, the upper cutting edges thereof, and, therefore, lubricates said units to the required extent, discharging the lubricant at and immediately adjacent to the points where the cutting operation is taking place, which are the most advantageous points for lubricating purposes. At the same time the lubricant assists in carrying away the chips cut by the cutting units.

Each cutting unit 107 and 108 has therein a chip-clearance passage 133. The passage 133 is formed in the front side of the cutting unit, behind, in the direction of travel of said unit when making its cut, from the approximate base of the cutting part of the unit, and outwardly or forwardly to the front edge of the unit, being in the side which is opposite to that wherein the V-shape groove 116 is located. The relative positions in any cutting unit of the oil passages 127 and 128, the groove 116, and the chip-clearance passage 133, and the aforesaid cutting part of said unit are clearly shown in Fig. 7. It will be observed that the passage 127 is larger than the passage 128, the reason for which is because the former is utilized in supplying a plurality of the latter. The cutting part of each unit 107 is indicated by the numeral 135, and such part of each unit 108 is indicated by the numeral 136.

The roughing and finishing cutters A and B in each compound cutter have to be tilted or inclined to the horizon sufficiently to obtain with their cutting units, which are all of the same height, the required depth of slot, and to this end a plurality of horizontal cap-screws 137 and a horizontal bolt 138 and nut 139 therefor, and a plurality of vertical, adjusting screws 231 are provided, and a series of vertical slots 140 are formed in the vertical part of the support 106. The slots 140 open through the top of the upright part of the support 106. In the present case there is a cap-screw 137 and a screw 231 at each end of each roughing cutter A and one of each at each end of each finishing cutter B, and in addition to the said screws for said roughing cutter the bolt 138 and nut 139 are provided. Washers 141 are introduced between the heads of the cap-screws 137 and of the bolt 138 and the adjacent side of the upstanding part of the support 106. The cap-screws 137 and bolt 138 are received in the slots 140, and said cap-screws are tapped into the holders 111 and 112, while said bolt passes through said holder 111 and its wedge bar 126 to receive the nut 139 outside of said bar. The purpose of the bolt 138 and nut 139 is to prevent the central part of the long roughing cutter A from springing outwardly from the upright part of the support 106. The slots 140 are of sufficient size to enable the cap-screws 137 and bolt 138 to be moved therein to whatever extent may be necessary in order to give to the cutters A and B the proper incline. The screws 231 are tapped into and through the holders 111 and 112, and bear at their bottom ends on the horizontal part of the support 106, or on bearing members 232 set in such horizontal part. The holders 111 and 112 and the cutters, of which such holders constitute parts, are adjusted at the required angle to the horizontal part of the support 106, by turning the screws 231 up and down as may be and to the extent required. This is done after loosening the cap-screws 137 and the nut 139. After tilting or inclining the cutters A and B at the proper angle in each case, by means of the screws 231, the cap-screws 137 are tightened and the nut 139 is tightened on the bolt 138. Convenient and accurate means are thus afforded for adjusting at any time the cutters A and B at the required angle, and for securely holding them after such adjustment. The proper adjustment of each cutter A and B requires that the distance between the horizontal plane of the top of the cutting part 135 of the front or foremost cutting unit 107, and that of the top of such cutting part, of the rearmost cutting unit 108, be equal to the depth of the gear-tooth slot cut by said units in conjunction with the units which intervene. It is now clearly to be seen how we are able to utilize compound cutters which have roughing and finishing cutters each with cutting units of the same size and height or depth. Otherwise it would be necessary to employ in each cutter cutting units of different sizes or at least of different heights or depths.

Although we prefer to employ cutting units which have a single cutting part 135 (or 136) and a single chip passage 133, such part and such passage may be duplicated in a single unit, as shown in Fig. 8, and it might, in some cases, be feasible to provide a cutting unit with even more than two of the parts and passages in question.

The cutting part 135, of each cutting unit 107, is narrower than the finished slot in the gear blank which is cut in part by said unit, while the width of the cutting part 136, of each cutting unit 108, is of the width of said slot and with its companion cutting units makes the finishing cut whereby said slot is produced. The cutting units 107 first cut the slot of the proper depth, but of slightly less width than is required for the finished slot, and usually without curvatures therein, and then the cutting units 108 take off a little on both sides of the slot cut by said units 107, thus cutting said slot to width and at the same time forming the curves in the sides of said slot which constitute in part the sides of two of the finished gear teeth. In other words, the cutting units 107 are sufficiently smaller than the slot to permit the cutting units 108 to give the required form or shape to said slot. The cutting units herein shown are for involute gear teeth. For cycloidal teeth some change in the general shape of the cutting units would be required, but the foregoing rule would, nevertheless, apply.

In Figs. 18 and 19 we have illustrated the operation of the roughing cutter A of a compound cutter at the beginning of its operation on a gear blank 95, wherein the leading cutting units 107, in the direction of said compound cutter when making its active stroke, are making their initial cut in said blank, while in Figs. 20 and 21 the rearmost, following cutting units 107 are coming into action and the slot is being materially deepened and shortly will be of the required depth, substantially as is represented at 145 in Figs. 21, 22, and 23. The slot while in the process of being roughed out is represented at 142. The initial operation of the cutting units 108, of the finishing cutter B of the aforesaid compound cutter, is illustrated in Figs. 22 and 23, wherein the leading units 108 are widening, as represented at 143, the slot 145. In the last two views the cutting units 108, which are at or adjacent to the rear end of the finishing cutter B, in the direction of travel in making its cut, are almost in the act of completing the slot 142 and converting it into a true gear-tooth slot, substantially like that represented at 144 in Fig. 25.

The operation of the cutting units 107 and 108, and the manner in which gear blanks are cut therewith, will be clearly understood from the foregoing explanation, together with the illustrations to which the same specifically refers.

Assuming that the three gear blanks 95 are in place on the arbors 82, with the three compound cutters, or rather the three roughing cutters A and the three finishing cutters B, properly adjusted to cut the depth of slots required in said blanks, and that the carriage 5 has just started on its left-hand or forward travel, the complete operation of the machine is, briefly, described as follows:

As the carriage 5 carries the compound cutters into contact with the gear blanks 95, the cutting parts 135 of the leading cutting units 107 cut shallow grooves in the portions of the blanks which are nearer to the advancing units, which grooves are deepened as one after the other of said cutting units encounters the blanks and passes through and beneath them, until slots of the full depth, such as that represented at 145, in Figs. 21, 22, and 23, are formed. Then the foremost of the cutting parts 136, of the advancing cutting units 108, encounter the blanks 95 and commence to widen the slots (145) from below, continuing such widening operation until the last of said cutting parts has passed through said slots and converted them into the finished slots, such as that represented at 144 in Fig. 25. This finishing action rounds the corners of the slots at the top and bottom so as to produce the proper gear-tooth formation. The hanger 46 is, meanwhile, in its vertical position against the face of the abutment 43, and the gear-blank-holding members are in their low position and support the gear blanks 95 in proper position for the operation thereon of the compound cutters, the force of gravity being sufficient to hold said hanger and said members in the respective positions just described. The cutting parts 135 and 136 pass between the serrations in the shrouds 103 which are in foremost position.

After the last cutting units 108 have made their cuts, the rod 34 is actuated to the left by the dog 37 or by its horizontal member 42, and the shipper mechanism is operated to reverse the carriage 5. Meanwhile the roll 56 has passed beneath the switch 62 onto the rail 63, after rocking said switch upwardly, and the latter has dropped down behind said roll. The travel of the carriage 5 to the right is so timed or the parts and members are so proportioned, that, before the right-hand ends of the compound cutters arrive in position to contact with the gear blanks 95, the inclined switch 62 has passed beneath and elevated the roll 56 with attached members high enough to enable said cutters to clear said blanks. This result is produced by the mechanism which is operated by the roll 56, and which when operated thereby at this time rocks the hanger 46 on the rock-shaft 45 upwardly and outwardly, and so raises the carriers or holders for the blanks 45 high enough to take said blanks out of the path of the cutters.

As the carriage continues to move to the right the switch 62 passes from beneath the roll 56, and the rail 61 passes beneath said roll. The blanks 95 are now in their most elevated position and so continue until the rail 61 rides from beneath the roll 56. The forward swing of the hanger 46 actuates the pawls 91 into engagement with fresh teeth on the lock wheels 86, and also throws the detents 94$^a$ out of engagement with said wheels.

When the roll 56 drops down from the left-hand end of the rail 61, the hanger 46 is, in consequence of such movement of said roll permitted to assume its normal position. As the hanger 46 swings down into the normal or vertical position the pawls 91 advance the lock wheels 86 one tooth, and as soon as this is done the flat part 73 of the rock-shaft 71 permits the detents 94$^a$ to reengage said wheels. Uncut portions of the gear blanks 95 are now presented in proper position to be cut, upon the next forward stroke of the compound cutters.

As the carriage 5 approaches the right-hand end of its travel, the projection 42 of the dog 36 causes the rod 34 to be shifted to the right, and the shipper mechanism to be reversed again, this time in the manner required once more to cause said carriage to advance.

These operations, automatically brought about, are repeated until all of the teeth in the three blanks 95 have been cut and such blanks converted into bevel-gears.

The finished bevel-gears are removed from the arbors 82, after taking off the nuts 101 and washers 102, and another set of gear blanks is placed on said arbors and secured by means of said nuts and washers, in readiness for a repetition of the operations required to convert these blanks into bevel-gears.

The manner in which the lubricant may be supplied to the cutting parts 135 and 136 has been explained. Other means of lubrication may be employed if desired.

It is understood, of course, that the timing of the operations of the carriers 90 and the detents 94$^a$ is such that the pawls 91 advance the lock wheels 86 while said detents are disengaged from the teeth of said wheels, although the detents commence to approach locking position as soon as said pawls commence to rotate said wheels.

The gear blanks 95 are rotated in the indexing operation to the left.

Each detent 94$^a$ may, if desired, be provided at the upper end with a projection 146, as shown in Fig. 5, to serve as a handle for disengaging said detent from its lock wheel 86 by hand should occasion require.

With this machine the gear teeth are cut expeditiously at a single forward stroke of the compound cutters, that is to say, each compound cutter cuts a complete gear-tooth slot every time that said cutter advances. The gear blanks being automatically indexed, and the compound cutters producing gear-tooth slots at each forward stroke, said blanks are converted into bevel-gears as fast as it is practicable to reciprocate the compound cutters. And this can be done with compound cutters which are comparatively short, it being necessary to provide only enough cutting units to obtain the required depth and width without undue strain on either the cutting units or the material being cut; and without undue wear and tear on said units. It has been found that a great amount of accurate and satisfactory work can be performed with compound cutters which are comparatively short and comprise a comparatively small number of cutting units. It is both practicable and possible to cut the bevel-gears at a fairly high rate of speed.

The cross-head 4 must be raised or lowered to accommodate the gear-blank holders to the gear-blanks so that the latter will, when in the path of the compound cutters, be located at exactly the proper elevation for said cutters to do their work accurately. In altering the position of the cross-head 4 it is necessary to operate the turn-buckle 60 to lengthen or shorten the connection between the rocker-arms 48 and 51, accordingly as said cross-head be raised or lowered. This applies, also, to the next example.

The machine just described may be fitted for cutting spur-gears by making some comparatively slight alterations in the specific construction and arrangement of certain of the parts and members of the holding and indexing mechanism, as illustrated in Figs. 13, 14, and 15. These alterations will next be described.

The same hanger 46 is used, also the rock-shaft 71 with the eccentric collars 81 thereon, and the mechanism for operating said rock-shaft when said hanger is operated. The rock-shaft 71 in this case, however, is arranged with the flat side 73 uppermost, instead of being at the front. Three blocks 147 in place of the blocks 67 are secured to the face of the hanger by means of the bolts 68 and the spline 69, said blocks 147 like said blocks 67 having flanges 70 for said bolts. The spline 69 in this and the other case may be attached to the blocks or to their flanges by means of screws, one of which is shown at 148 in Fig. 15. The blocks 147 extend horizontally forward from the hanger 46, or are perpendicular to said hanger. Each block 147 is recessed at its inner end in the center, as represented at 149 in Fig. 15. A horizontal arbor 150 is journaled in the center of the block 147 and projects at one end into the recess 149 and at the other end beyond said block. A nut 151 and a washer 152 are provided in the recess 149 to secure the arbor 150 at its inner end, and a nut 153 and a washer 154 are provided for the outer end of said arbor. The arbor 150 has an integral flange 155 outside of the block 147 in which said arbor is journaled, and that portion of said arbor which extends outwardly beyond said flange is designed to receive one or more spur-gear blanks 156. Preferably the aforesaid portion of the arbor 150 is of sufficient length to accommodate two or more of the blanks 156, three of such blanks appearing in Figs. 13 and 15. The blanks 156 are held in place between the flange 155 and the washer 154 and nut 153, being rigidly secured to the arbor by said nut and washer. A serrated lock wheel 157 is mounted on the arbor 150 inside of the flange 155, and is keyed to said arbor at 158. A ratchet-wheel 159 is secured to the inner side of the lock wheel 157 by means of screws 160. The wheel 157 has a hub 161 which with said wheel separates the flange 155 from the outer end of the supporting block 147. An oscillatory carrier 162 is mounted on the hub 161, and connected with the adjacent eccentric collar 81 by means of a connecting-rod 163. A pawl 164, for the ratchet-wheel 159, is pivoted at 165 to the outer face of the carrier 162, and a spring 166 is provided on said carrier for said pawl.

The washer 154 has a slot 167 therein which enables said washer to be removed from the arbor 150, when the nut 153 is loosened, without removing said nut from said arbor. The portion of the arbor 150 which carries the spur-gear blanks 156 is larger than the largest diameter of the nut 153, so as to enable said blanks to be slipped off of said arbor over said nut, after the washer 154 has been removed. A similar arrangement is applicable to the first construction.

A detent 168 is provided for each lock wheel 157, said detent being received in a slot 169 in the center of the top of the block 147 which supports said detent. The detent 168 is pivotally attached at 170 to its block 147, and projects forwardly from the pivot into position to engage the teeth of the lock wheel 157. Said detent projects rearwardly from the pivot 170, and a spring 171 is arranged between the block 147 and the rearward projection of the detent, to urge the latter into engagement with the lock wheel 157. The detents 168 may have the handles 146 as shown.

The operation of the holding and indexing mechanism just described for spur-gears is substantially the same as that of the holding and indexing mechanism hereinbefore described for bevel-gears, so that no extended explanation of the operation of the spur-gear mechanism need be given.

It will be noted that, when more than one spur-gear blank 156 is mounted on each arbor 150, gear-tooth slots are cut in all of said blanks at each forward or active stroke of the compound cutter with which said blanks are in line. Thus the cutting capacity of the machine is increased according to the number of blanks on an arbor, and the production of the machine very greatly increased.

While it is probably better, in most if not all cases, to reciprocate the compound cutters and hold the work stationary while being cut thereby, it is possible to construct a machine wherein the cutters are held stationary and the work is reciprocated during the cutting operation. An example of such a machine, or of such parts thereof as are necessary to illustrate the feature in question appears in Fig. 16. There are herein shown fragmentary parts of the frame 1 and one of the uprights 3, the cross-head 4, and the carriage 5, together with the rack 8, and pinion 9 on the shaft 10 by means of which said carriage is reciprocated. A supporting member or support 172 is mounted on the front of the cross-head 4, and said support is provided with a plurality of pairs of forwardly-extending lugs 173 in which there are vertical slots 174. Supported at one end of a horizontal rod 175, which extends through and is adapted to be moved up and down in the slots 174, is a plurality of rocker-arms 176. Each rocker-arm 176 is movably connected at 177 with a pair of lugs 178 at the top of a bracket 179 that rises from the front end of the frame 1. The rocker-arm 176 has on one side a horizontal lip or flange 180 which, with said side of said arm, constitutes a support, similar to the support 106, of a compound cutter, and for the different elements which enter into the construction and formation of the roughing cutter A and the finishing cutter B of said compound cutter. The roughing cutter A and the finishing cutter B, in this case, are similar in all particulars to the roughing and finishing cutters in the other cases, and here function in a similar manner, except that the cutting parts of the former are directed downwardly instead of upwardly, and said cutters are not reciprocated.

It is necessary that the compound cutters be inverted so that their cutting parts are underneath, because the work in this machine is actuated beneath said cutters, instead of the cutters being actuated beneath the work.

Means are provided for raising the compound cutters out of the path of the work, when the latter makes its return or inactive stroke, and such means consists of a rocker-arm 181 movably connected at 182 with a bracket 183, and provided at its forward or free terminal with a roll 184, and a connection between said rocker-arm and the rod 175. The bracket 183 is secured against the front of the upright 3 which appears in the view. The aforesaid connection consists of heads 185—185 having screw-threaded parts or extensions 186, and a turn-buckle 187 which connects said extensions. The lower head 185 is pivotally attached at 188 to the front side of the rocker-arm 181. The upper head 185 is mounted on the front terminal of the rod 175. Rails 189 and 190 and a switch 191 are provided for the roll 184. The switch 191 is pivoted at 192 to the forward end of the rail 189. The rail 190 curves downwardly and forwardly from a part 193 which is secured to the front side of the carriage 5. The rail 189 is also secured to the front side of the carriage. The mechanism last described is very similar to generally corresponding parts in the first construction, but the lower head 185 is here pivoted directly to the rocker-arm 181 which is provided with the roll 184, and the rail 189 is considerably longer than the rail 61, while the switch 191 and the rail members 190 and 193 are much shorter than the switch 62 and the rail members 63 and 64 in the other case.

As the carriage 5, in the example of the machine now being described, approaches the forward end of its travel, the rail 190 passes beneath the roll 184, and the switch 191 drops at its forward end onto said rail in front of said roll. Now, when the carriage returns or moves to the right, the switch 191 is carried beneath the roll 184 and quickly elevates the same. When the roll 184 is elevated, by the switch 191, the rocker-arm 181 is swung upwardly on the pivot 182 and carries with it the connecting members between said rocker-arm and the rod 175. The rod 175 is thus elevated in the slots 174, and carries upwardly with it the connected ends of the rocker-arms 176, each of the latter swinging or rocking on its pivot 177 in the lugs 178, at the top of the bracket 179, which supports the forward terminal of said rocker-arm. This upward movement of the rocker-arms 176 raises the compound cutters which are attached to and carried by, as well as include, said rocker-arms.

The compound cutters are raised to a sufficient extent to remove them from the path of the work, when the latter is carried to the right into position to commence the active stroke again. The parts are maintained in elevated position by the rail 189 until said rail passes from beneath the roll 184, when the elevated parts and members drop by gravity, as far as the bottoms of the slots 174 permit. The roll 184 is now in position to enable the rail 189 to pass above the same, when said rail is carried to the left at the next active stroke of the cutting elements. The left-hand terminal of the rail 189 is beveled at 194 in a similar manner and for a similar purpose as is the corresponding end of the rail 61.

It is now seen that each compound cutter is automatically raised from the path of the work and automatically returned to such path, but that the indexing of the work is not performed by the same means.

In the present arrangement of the machine, in which the compound cutters are stationary while the work is being cut, provision is made for cutting both spur-gear and bevel-gear blanks at the same time, although such provision is not necessary, and the machine may be arranged to cut only one kind of gear blanks. While there must be as many gear-blank-holding and indexing devices, for each of the aforesaid types of blanks, as there are compound cutters, inasmuch as we have shown only a single compound cutter we have shown holding- and indexing-devices only for each of the two types of gear blanks to be cut. These devices are very similar to those previously described, so that they are not shown in full detail nor will they be so described.

Securely attached to the carriage 5, adjacent to the right-hand end thereof, is a bed-plate 195, and rising from said bed-plate intermediate of the end of the same is a vertical plate 196. One of a plurality of horizontal blocks is shown at 197 secured to the left-hand side of the plate 196, and one of a plurality of oblique blocks is shown at 198 secured to the right-hand side of said plate. The block 197 is provided with means for holding and indexing a plurality of spur-gear blanks 199, such means comprising a lock wheel 200, a ratchet-wheel 201, and a carrier 202. The latter is connected, by a connecting-rod 203, with an eccentric collar 204 on a horizontal rock-shaft 205, which shaft is journaled in the block 197. The rock-shaft 205 is flattened at 206 to act upon and operate a detent 207 for the lock wheel 200, as shown in Fig. 17. The carrier 202 is provided with a spring-pressed pawl 208 to engage the ratchet-wheel 201, said pawl also appearing in Fig. 17. The oscillation of the rock-shaft 205 causes the gear blanks 199 to be advanced one tooth in precisely the same manner as do corresponding parts which are illustrated in Figs. 13, 14, and 15.

A bevel-gear blank 207 is represented as being mounted on an arbor 208 which is journaled in the block 198. A nut 209 and a washer 210 appear on the upper terminal of the arbor 208, and a shroud 211 is provided for the gear blank 207. An indexing device, similar to that shown in Fig. 5, is provided for the blank 207. The said device comprises a rock-shaft 212 flattened at 213 and provided with an eccentric collar 214, a lock wheel 215 and a detent 216 for said wheel, a ratchet-wheel 217, and a carrier 218 which is connected, by means of a connecting-rod 219, with said collar, and has a spring-pressed pawl (not shown) for said ratchet-wheel. The indexing device for the gear blank 207 operates to actuate the detent 216, and to advance or rotate said blank, intermittently, as in the first example herein shown and described.

The aforesaid indexing devices are subject to the mechanism described below.

A rocker-arm 220 depends from the forward end of the rock-shaft 205, and a rocker-arm 221 depends from the corresponding end of the rock-shaft 212. A spring 222 extends between the plate 196 and the rocker-arm 221, and tends to draw said arm toward the left. A horizontal rod 223 connects the rocker-arms 220 and 221. The rocker-arms 220 and 221 are provided at their bottom ends with blocks 224—224, which are pivoted at 225—225 to said arms, and the rod 223 extends through said blocks and through a vertical slot at 226 in the plate 196. The rod 223 has thereon nuts 227, or equivalent members, located at the ends of the blocks 224. Said rod also has thereon a nut 228, or equivalent member, which is adapted to encounter the plate 196 and thus limit the movement of said rod toward the left. The blocks 224 and the pivots 225 permit the rod 223 to be moved longitudinally and at the same time rock the rocker-arms 220 and 221. The spring 222, acting through the rocker-arm 221, normally retains the rod 223 with the nut 228 against the right-hand side of the plate 196. Both the rocker-arms 220 and 221 are then in an approximately vertical position. The rod 223 extends to the left beyond the rocker-arm 220, and this projecting terminal of said rod has secured thereto an adjustable collar 229. A lug 230 projects from the bracket 183 into the path of the collar 229. The collar 229 is provided and made adjustable on the rod 223 in order to obtain a member which is adapted to contact with the lug 230, which member can be adjusted so as to change the amount of movement imparted, by reason of such contact, to the rod 223.

When the carriage 5, upon which the bed-plate 195 is mounted, arrives nearly at the end of its left-hand travel, the collar 229 encounters the lug 230 and the rod 223 is thereby forced to the right, against the resiliency of the spring 222. This movement of the rod 223 is imparted to the rocker-arms 220 and 221, said arms are swung in the same direction that said rod is actuated, and the rock-shafts 205 and 212 are operated to unlatch the lock wheels 200 and 215, and set the pawls for the ratchet-wheels 201 and 217 in position to advance the gear blanks 199 and the gear blank 207. Upon the return of the reciprocating members, the collar 229 is carried away from the lug 230, so that the rod 223 is released to the action of the spring 222, to the end that said spring returns the rocker-arms 220 and 224, with their connected rock-shafts 205 and 212, respectively, to their normal or initial positions, and the blanks 199 and 207 are indexed. Said blanks are indexed by the action imparted to the ratchet-wheels 201 and 217 at this time through the medium of the carriers 202 and 218, to which the pawls for said ratchet-wheels are attached, and which carriers are actuated by means of the connecting-rods 203 and 219 and the eccentric collars 204 and 214. Directly after the indexing operation, the flattened parts 206 and 213 of the rock-shafts 205 and 212, respectively, permit the detents 207 and 216 to reengage their respective lock wheels 200 and 215.

From the foregoing it is clear that, at each forward stroke of the members which carry the gear blanks 199 and 207, said blanks are forcibly actuated past the compound cutter, the cutting parts 135 and 136 of which are in the path thereof, and that a gear-tooth slot is cut by said cutting parts in each of said blanks. The gear-tooth slots are cut in the tops of the blanks 199, and in the upper rear portion of the blank 207. During this operation the compound cutter is necessarily in its low position. While the compound cutter is in raised position, the gear blanks are returned to the starting point, and pass clear of said cutter. The compound cutter is then lowered again into operative position, and another active stroke of the gear-blank-carrying members is made.

The collars 204 and 214 are made eccentric for the same reason that the collars 81 are so made.

We have shown and described means for raising and lowering one end only of the rod 175, but it is obvious that such means must be duplicated for the other end of said rod, especially if the rod have connected therewith more than one compound-cutter rocker-arm 176.

No means other than the action of gravity on the rocker-arms 176 and the parts and members carried thereby and attached to or connected therewith are required, more especially in view of the fact that the tendency of the cutting elements is to dig in, so to speak, and thus to force the elements downwardly rather than upwardly, a tendency which is present as well in the other cases.

In Fig. 16 the rocker-arm 176 is supported in such a manner, when down with the compound cutter in operative position, as to give the necessary inclination to said cutter in order to enable the same to cut slots of the required depth. In this view the slots cut with the roughing cutter A in the spur-gear blanks 199 have been started.

In order to render the compound cutters, in this case, adjustable so that gear blanks of different diameters can be cut therewith, it is necessary to make provision for changing the height of the pivot 177 at the right-hand end of each rocker-arm 176. To this end the bracket 179 is attached to the right-hand end of the bed 1 by means of bolts 231 which pass through vertical slots 232 in said bracket. The elevation of the path of travel of the rod 175, which supports the rocker-arm 176 at the left-hand end, can be changed by raising or lowering the cross-head 4, and adjusting the turn-buckle 186 accordingly.

No shroud is needed for the spur-gear blanks for the reason that there is practically no liability of breaking out parts thereof as there is in the case of bevel-gear blanks.

The terms broach and broaching, as herein employed, refer to that type of instrument, implement, or device which cuts into the work in a straight line or path, and cuts away the material the full width of the slot that is to be made or cut in said work, and to the operation of such a device, in contradistinction to a rotary device, such as a milling tool, or to a planing device operating independently on opposite sides of a slot, and the action thereof. The cutting implement or broach which we employ includes two kinds of cutting units, namely, roughing units and finishing units, as already made clear, but both sets of such units are in line with each other, and the units in each set cut the full width of slot by simultaneous action, to some extent at least, on all three sides of the slot. Although the finishing units enter the slot cut by the roughing units, and do not, therefore, remove the central portion of the material from the slot, since that has already been removed, they do cut and shape all three sides of the slot to a greater or less extent, and, in the absence of the roughing units, would cut away all of the material to form the slot, so that said finishing units are, to all intents and purposes, of the same nature as the roughing units, and are no more similar to a rotary cutter or milling tool, or a pair of planing tools, than are the roughing units.

What we claim as our invention, and desire to secure by Letters Patent, is:—

1. In a multiple gear-cutting machine, a broach, oscillatory work-holding means, means to bring said broach and the work held by said first-named means into contact, and automatic indexing means for said work.

2. In a multiple gear-cutting machine, a broach, oscillatory work-holding means, automatic means to cause said broach to act on the work held by said first-named means, and automatic indexing means for said work.

3. In a multiple gear-cutting machine, a broach, oscillatory automatically-indexed work-holding means, and means to cause said broach to act on the work held by said first-named means.

4. In a multiple gear-cutting machine, a broach, oscillatory automatically-indexed work-holding means, and automatic means to cause said broach to operate on the work held by said first-named means.

5. In a multiple gear-cutting machine, means to hold a gear blank, cutting means for said blank, means to reciprocate one of said first-two mentioned means in a fixed plane, and automatic indexing means for said blank, whereby a complete gear-tooth slot is broached in said blank each time said cutting means and said blank are brought into contact.

6. In a multiple gear-cutting machine, means to hold a gear blank, cutting means for said blank, means to reciprocate said cutting means in a fixed plane, and automatic indexing means for said blank, whereby a complete gear-tooth slot is broached in said blank at each active stroke of said cutting means.

7. In a multiple gear-cutting machine, means to hold a gear blank, cutting means for said blank, means to reciprocate said cutting means always in a fixed plane, whereby a complete gear-tooth slot is broached in said blank at each active stroke of said cutting means, and automatic means to move said gear-blank-holding means out of the path of said cutting means, whereby the latter is enabled to make its return stroke without contact with said blank.

8. In a multiple gear-cutting machine, means to hold a gear blank, cutting means for said blank, means to reciprocate said cutting means always in a fixed plane, automatic means to move said gear-blank-cutting means out of the path of said cutting means, whereby the latter is enabled to make its return stroke without contacting with said blank, and automatic indexing means for said blank, whereby a complete gear-tooth slot is broached in said blank at each active stroke of said cutting means.

9. The combination, in a multiple gear-cutting machine, with a reciprocating carriage, and cutting means mounted on said carriage, of holding means for gear blanks, and means, controlled by said carriage, to move said holding means so that a gear blank held thereby shall be located in and out of the path of said cutting means, accordingly as the latter makes its active and inactive stroke.

10. The combination, in a multiple gear-cutting machine, with a reciprocating carriage, and cutting means mounted on said carriage, of holding and indexing means for gear blanks, and means, controlled by said carriage, to move said holding means so that a gear blank held thereby shall be located in and out of the path of said cutting means, accordingly as the latter makes its active and inactive stroke, and such gear blank is indexed after said active stroke has been made.

11. The combination, in a multiple gear-cutting machine, with a reciprocating carriage, and cutting means mounted on said carriage, of holding means for gear blanks, said holding means consisting in part of an oscillatory hanger, and means, controlled by said carriage, to actuate said hanger to cause the same to remove said blanks from the path of said cutting means, during the inactive stroke of the latter.

12. The combination, in a multiple gear-cutting machine, with a reciprocating carriage, and cutting means mounted on said carriage, of an oscillatory hanger, indexing means attached thereto, and means, controlled by said carriage, to operate said indexing means.

13. The combination, in a multiple gear-cutting machine, with a reciprocating carriage, and cutting means mounted on said carriage, of gear-blank holding and indexing means, and operating means for said holding and indexing means, said operating means being controlled by said carriage for the purpose of causing gear blanks to be located in and out of the path of said cutting means, and to be indexed.

14. The combination, in a multiple gear-cutting machine, with a reciprocating carriage, and cutting means on said carriage, of an oscillatory hanger, indexing means attached to said hanger and adapted to be operated thereby, and operating means for said hanger, said operating means being controlled by said carriage.

15. The combination, in a multiple gear-cutting machine, with a reciprocating carriage, and cutting means mounted on said carriage, of an oscillatory hanger, gear-blank holding means attached to said hanger, indexing means also attached to said hanger and adapted to be operated thereby, and operating means for said hanger, said operating means being controlled by said carriage.

16. The combination, in a multiple gear-cutting machine, with a reciprocating carriage, and cutting means mounted on said carriage, of an oscillatory hanger, an abutment for said hanger, means controlled by said carriage to actuate said hanger away from said abutment and permit it to return thereto, and gear-blank holding means attached to said hanger.

17. The combination, in a multiple gear-cutting machine, with a reciprocating carriage, and cutting means mounted thereon, of an oscillatory hanger, a vertically adjustable support for said hanger, operating means, controlled by said carriage, for said hanger, said operating means consisting in part of an adjustable element, and gear-blank holding means attached to said hanger.

18. The combination, in a multiple gear-cutting machine, with a reciprocating carriage, provided with rails which are spaced from each other, and with a switch arranged normally to close the space between said rails, and cutting means mounted on said carriage, of a supporting member, a rock-shaft carried by said supporting member, a hanger attached to said rock-shaft, work-holding means attached to said hanger, a second rock-shaft, a rocker-arm attached to said second rock-shaft and having a part which is adapted to be raised and lowered by said rails and switch as said carriage reciprocates, and connecting means between said rock-shafts.

19. The combination, in a multiple gear-cutting machine, with a reciprocating carriage provided with rails which are spaced from each other, and with a switch arranged normally to close the gap between said rails, and cutting means mounted on said carriage, of a vertically adjustable support, a rock-shaft carried by said support, a hanger attached to said rock-shaft, work-holding means attached to said hanger, a second rock-shaft, a rocker-arm attached to said second rock-shaft and having a part which is adapted to be raised and lowered by said rails and switch as said carriage reciprocates, and adjustable connecting means between said rock-shafts.

20. The combination, in a multiple gear-cutting machine, with a reciprocating carriage provided with rails which are spaced from each other, and with a switch arranged normally to close the space between said rails, and cutting means mounted on said carriage, of a supporting member, a rock-shaft carried by said supporting member, a hanger attached to said rock-shaft, indexing means attached to said hanger and adapted to be operated by the oscillatory movement of the hanger, a second rock-shaft, a rocker-arm attached to said second rock-shaft and having a part which is adapted to be raised and lowered by said rails and switch as said carriage reciprocates, and connecting means between said rock-shafts.

21. The combination, in a multiple gear-cutting machine, with a reciprocating carriage provided with rails which are spaced from each other, and with a switch arranged normally to close the space between said rails, and cutting means mounted on said carriage, of a supporting member, a rock-shaft carried by said supporting member, a hanger attached to said rock-shaft, work-holding means attached to said hanger, indexing means attached to said hanger and adapted to be operated by the oscillatory movement of the hanger, a second rock-shaft, a rocker-arm attached to said second rock-shaft and having a part which is adapted to be raised and lowered by said rails and switch as said carriage reciprocates, and connecting means between said rock-shafts.

22. The combination, in a multiple gear-cutting machine, with a reciprocating carriage, and cutting means mounted on said carriage, of a movable hanger provided with a block, work-holding means consisting in part of an arbor journaled in said block, a ratchet-wheel, a lock wheel, and a carrier, provided with a pawl to engage said ratchet-wheel, mounted on said arbor, said ratchet-wheel and lock wheel being secured to said arbor, a detent for said lock wheel, means to actuate said hanger from said carriage, and means to release said lock wheel from said detent and to actuate said carrier partially to rotate said arbor, through the medium of said pawl and ratchet-wheel, from said hanger, when the latter is actuated.

23. The combination, in a multiple gear-cutting machine, with a reciprocating carriage, and cutting means on said carriage, of an oscillatory hanger operatively connected with said carriage, said hanger being provided with blocks, work-holding arbors journaled in said blocks, said arbors being provided with rotating means, a mutilated rock-shaft also journaled in said blocks and in operative connection with said rotating means, and operating means for said rock-shaft, between the latter and said hanger.

24. The combination, in a multiple gear-cutting machine, a reciprocating carriage, and cutting means mounted on said carriage, of an oscillatory hanger operated by said carriage, said hanger being provided with blocks, work-holding arbors journaled in said blocks, lock wheels, ratchet wheels, and carriers mounted on said arbors, said lock wheels and ratchet-wheels being secured to said arbors, and said carriers being provided with pawls for said ratchet-wheels, spring-pressed detents pivotally connected with said blocks in operative relation to said lock wheels, a mutilated rock-shaft journaled in said blocks in operative relation to said detents, and operatively connected with said carriers, a rocker-arm carried by said rock-shaft, and connecting operating means between said hanger and said rocker-arm.

25. In a multiple gear-cutting machine, a plurality of broaches, a plurality of work-holders, means to bring said broaches and the work held by said work-holders into contact, and means adapted to be operated at one point to index simultaneously said work-holders.

JULIAN L. PERKINS.
FRANK W. SICKLES.
JOHN OAKLEY.

Witnesses:
F. A. CUTTER,
ARTHUR A. BETH.